United States Patent

[11] 3,541,936

[72] Inventors  Joseph F. G. Miller
               Lincoln;
               Dudley David Cook, Jr., Concord,
               Massachusetts
[21] Appl. No. 721,224
[22] Filed      Apr. 15, 1968
[45] Patented   Nov. 24, 1970
[73] Assignee   Itek Corporation
                Lexington, Massachusetts
                a corporation of Delaware

[54] APPARATUS FOR COMPENSATING FOR CROSS-AXIS IMAGE MOTION IN TILTED PANORAMIC CAMERAS
13 Claims, 16 Drawing Figs.
[52] U.S. Cl. .................................................. 95/12.5
[51] Int. Cl. .................................................. G03b 37/02
[50] Field of Search ...................................... 95/12.5

[56] References Cited
UNITED STATES PATENTS
3,422,739  1/1969  Zilko ........................ 95/12.5

Primary Examiner—John M. Horan
Attorneys—Homer O. Blair, Robert L. Nathans, Lester S. Grodberg and Joseph S. Iandiorio ABSTRACT: A panoramic camera having a variable scan rate which is utilized to compensate for distortion of the photographed scene when the axis about which the camera scans is tilted relative to the scan scene. One arrangement for panoramic cameras at high altitudes utilizes two panoramic cameras, one tilted aft, the other forward. The tilting of the axis of each of the cameras introduces a cross-axis image motion which results in distortion of the photographed image. This cross-axis image motion is compensated for by modifying the rate at which the film medium is scanned to provide a higher rate of scan when the cross-axis motion is in the direction of scan and provide a lower rate of scan when the cross-axis motion is in the direction opposite to the direction of scan.

DUDLEY D. COOK, J.
JOSEPH F. G. MILLER
INVENTORS.

BY Joseph L. Lanchorio

ATTORNEY.

DUDLEY D. COOK, Jr
JOSEPH F. G. MILLER
INVENTORS.

BY
Joseph S. Iardiorio

ATTORNEY.

Patented Nov. 24, 1970

DUDLEY D. COOK, Jr.
JOSEPH F. G. MILLER
INVENTORS.

BY

Joseph S. Iandiorio

ATTORNEY.

DUDLEY D. COOK, Jr
JOSEPH F. G. MILLER
INVENTORS.

BY *Joseph L. Sandiorio*

ATTORNEY.

APPARATUS FOR COMPENSATING FOR CROSS-AXIS IMAGE MOTION IN TILTED PANORAMIC CAMERAS

CHARACTERIZATION OF INVENTION

The invention is characterized in apparatus for compensating for cross-axis image motion in a tilted panoramic camera comprising means for providing accelerated relative motion between the film and image.

BACKGROUND OF INVENTION

This invention relates to apparatus for compensating for cross-axis image motion in a tilted panoramic camera.

At high altitudes the stereo convergence angle for vertical photography afforded by typical lenses used in panoramic cameras is too small to produce photographs providing suitable stereopsis. One arrangement which produces good base-height ratio for enhanced stereopsis uses two panoramic cameras, one tilted aft, the other forward, relative to the track of the camera across the area of interest, i.e. the track of the vehicle carrying the camera.

Although such an arrangement renders substantially improved photographs for purposes of stereopsis, it introduces a distortion which blurs the photographs. The blurring increases as the scan angle increases in either direction from the ground track of the camera: there is no such distortion at the center of any particular scan and maximum distortion at the lateral extremes of the scan.

The distortion is a result of the tipping of the scan axis of the camera which causes lines on the ground that are parallel to the track of the camera to have their images projected onto the oblique film as nonparallel lines, diverging from the intersection of the lens scanning axis with the ground. The blurring results from this nonparallel projecting of the lines which causes these images to be shifted sideways in the cross-axis direction.

SUMMARY OF INVENTION

Thus it is desirable to have available means for compensating for the cross-axis image motion components in tilted panoramic cameras.

It is also desirable to have available means for providing variable compensation corresponding to varying cross-axis components as a function of the scan and tilt angles.

It is also desirable to have available means for compensating for cross-axis image motion in both forward and aft looking cameras.

The invention may be accomplished in a tilted panoramic camera by means for modifying the uniform relative motion between the film and image. The means used to modify the uniform relative motion are responsive to the angular position of the scan conducted by the scanning mechanism to provide accelerated relative motion between the film and image to compensate for the cross-axis image motion component as the scanning mechanism scans between predetermined limits.

DISCLOSURE OF PREFERRED EMBODIMENTS

Other objects, features, and advantages will occur from the following description of preferred embodiments of the invention, taken with the accompanying drawings, in which.

Figure 1:
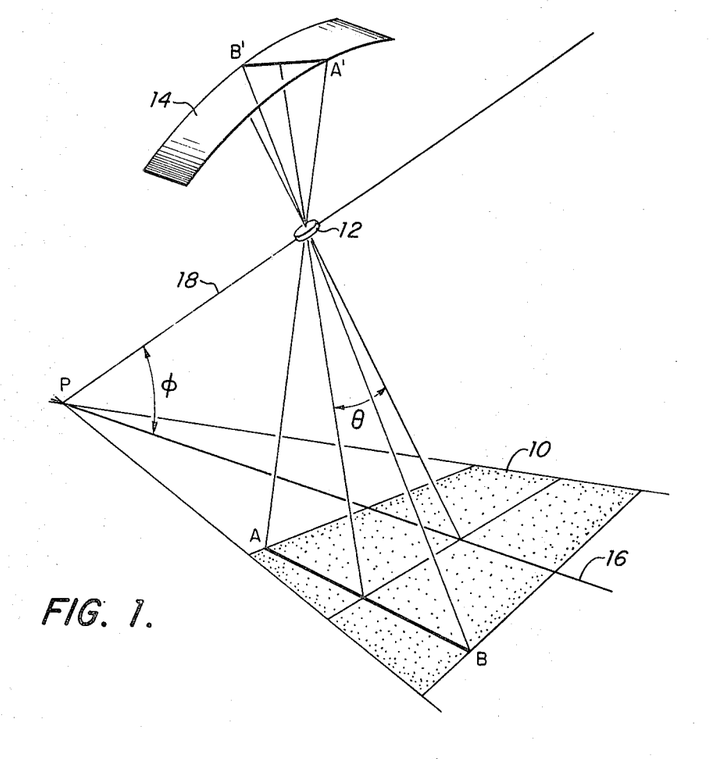
FIG. 1 is a perspective side view sketch of the geometric relationships is tilted panoramic photography.
Figure 2:
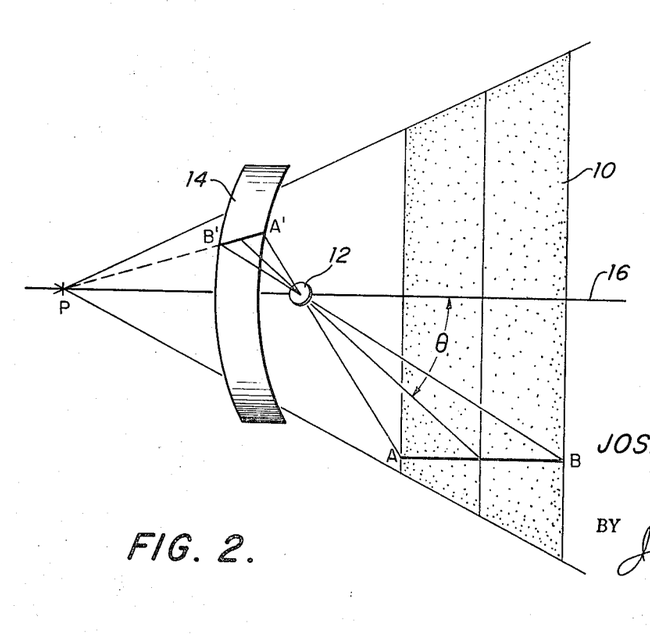
FIG. 2 is a top view sketch similar to FIG. 1.

In panoramic cameras tilted through an angle $\Phi$, FIG. 1, from the vertical, lines on the ground parallel to the track of the camera or flight direction, such as line AB on the projected format 10, FIG. 2, are not parallel as projected by lens 12 onto film 14 as line A'B'. And the divergence from parallel orientation for such lines increases as the scan angle $\theta$ increases in either direction from the ground track 16. Only parallel lines at the ground track are projected as parallel lines onto film 14. These divergent lines, if extended, would meet at point P, the intersection of the axis of rotation 18 of lens 12 with the ground.

Figure 3:
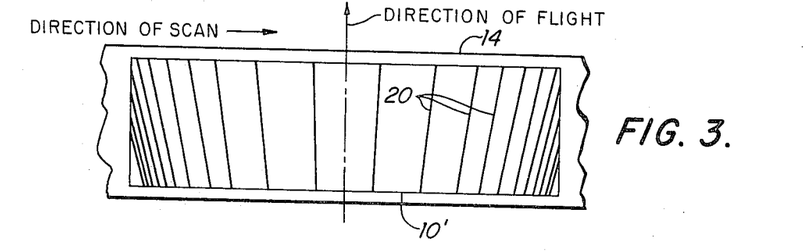
FIG. 3 is a representation of a photograph showing the effect of tilt distortion on longitudinal lines on a format.
Figure 4:
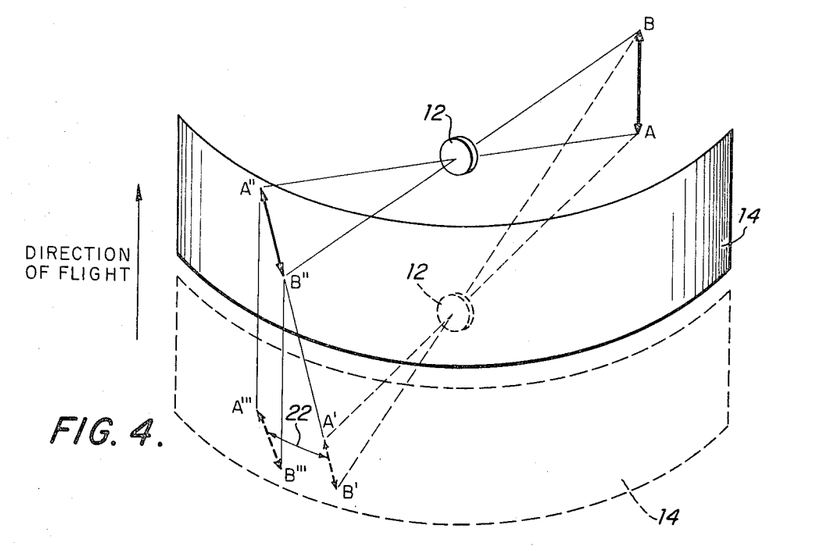
FIG. 4 is a schematic inclined top view showing the cross-axis image motion of parallel ground lines which were projected as divergent lines onto the oblique cylindrical surface of the film.

The result of such distortion is that longitudinal lines 20 of a unit grid on the ground that are parallel to the line of flight or the track of the camera are projected as divergent lines on the format 10' of the cylindrical film 14 as shown in FIG. 3 where lateral lines of the grid have been omitted for clarity. The image of a longitudinal line AB on the ground is projected onto film 14 by lens 12 as divergent image A'B' as shown in dashed lines in FIG. 4. At the next instant as the camera moves forward image A'B' appears as at A"B", full lines, having moved forward in a straight line colinear with A'B'. That motion, because of the divergence of image A'B', has resulted in a lateral shifting of the image relative to film 14 as is apparent from the distance 22 between image A'B' and line A"B", the projection of line A"B" on the original portion of film 14.

Figure 5:
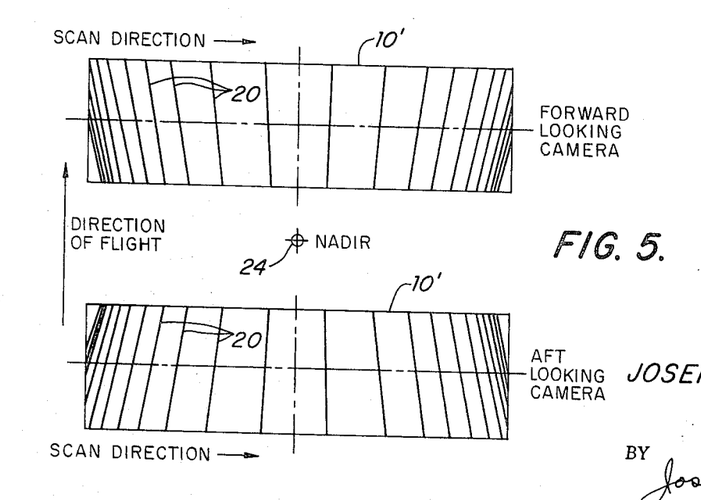
FIG. 5 shows a representation of a photograph from an aft-looking camera and from a forward-looking camera showing cross-axis image motion distortion.

The cross-axis component which causes the tilt distortion occurs in forward- and aft-looking cameras, FIG. 5. In forward-looking cameras the divergent line images of lines parallel on the ground appear to diverge from a point on the ground behind the nadir reference point 24 which is between the cameras, whereas in aft-looking cameras the divergent line images of lines parallel on the ground appear to diverge from a point on the ground forward of the nadir reference point.

The invention provides compensation for tilt distortion in forward- and aft-looking cameras having either left-to-right or right-to-left scan directions by accelerating the image and film relative to one another, as can be seen by the schematic diagrams in FIGS. 6, 7, 8, and 9, in each of which the flight direction or camera track is toward the top of the drawing, and the forward image motion compensation (IMC) toward the bottom. In each of FIGS. 6—9 the film is initially stationary, the relative motion between the image and film being provided by the motion of the scanning mechanism. Also, in each of FIGS. 6—9 vector VW represents the magnitude and direction of the uncompensated velocity of the image requiring IMC at the center of the film, and vectors OY, O'Y' represent the magnitude and direction of the uncompensated velocity of the image requiring IMC at points off-axis, which vectors are functions of the scan angle $\theta$ and tilt angle $\Phi$, FIGS. 1 and 2.

At the center of the film the entire vector VW may be compensated for by IMC. In off-axis locations vectors OY, O'Y' are only partially compensated for by IMC to the extent indicated by longitudinal components OZ, O'Z' of vectors OY, O'Y' and the cross-axis component of motion OX, O'X' remains.

Figure 6:
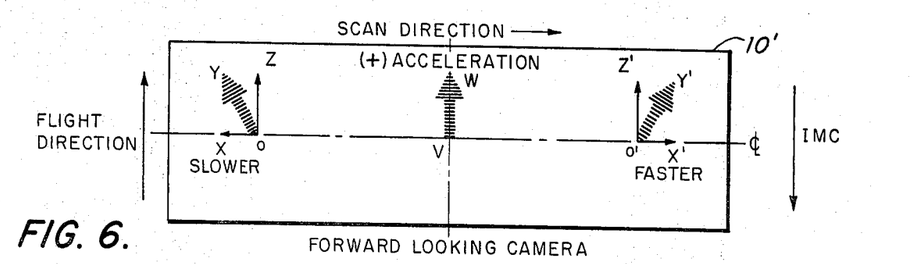
FIG. 6 is a sketch of the vector velocities of the image in a forward-looking camera with left-to-right scan induced image motion.

In a forward-looking camera, FIG. 6, as the image moves from left to right across the film, cross-axis components develop at off-axis points on the film. Since OX indicates that the image at point O is moving to the left, in the opposite direction of the image motion produced by the scan, moving the film to the left when the image is in this area will decrease the relative motion between the image and film and reduce the blurring. Component OX decreases as the divergence angle of OY decreases as the image moves toward the center of the film.

Component O'X' indicates that the image at point O' is moving to the right, i.e. in the same direction as the image motion produced by the scan; therefore moving the film to the right when the image is in this area will decrease the relative motion between the image and film and reduce the blurring. Component O'X' decreases as the divergence angle of O'Y' decreases at points closer to the center of the film. Blurring in this forward-looking camera may be eliminated, then, by starting at the left end of the film with the image moving relative to the film at a speed slower than normal, increasing that relative image speed as the image moves toward the center of the film at which point the image speed ideally should be at the normal speed, and continuing to increase that relative image speed as the image moves through the center point until that relative image speed reaches its maximum speed in excess of normal at the right end of the film.

Figure 7:
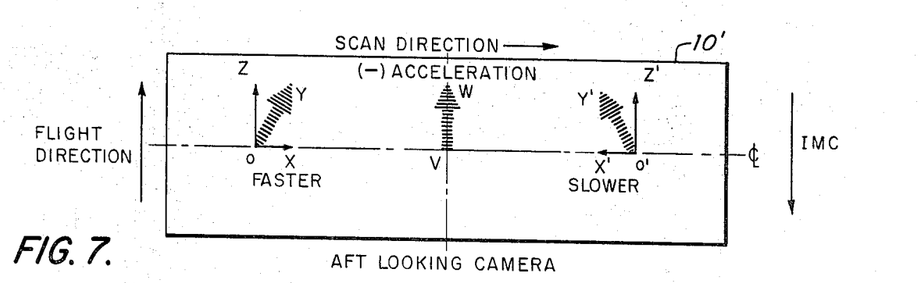
FIG. 7 is a sketch of the vector velocities of the image in an aft-looking camera with left-to-right scan induced image motion.

In the same situation in an aft-looking camera, FIG. 7, as the image moves from left to right across the film, cross-axis components develop at off-axis points on the film. Since OX indicates that the image at point O is moving to the right, in the direction of the image motion produced by the scan, moving the film to the right in this area will decrease the relative motion between the image and film and reduce blurring. Component OX decreases as the image sweeps toward the center of the film.

Component O'X' indicates that the image at point O' is moving to the left in the opposite direction of the image motion produced by the scan; therefore moving the film to the left in this area will decrease the relative motion between the image and film and reduce blurring. Component O'X' decreases as the divergence angle of O'Y' decreases at points closer to the center of the film. Blurring in this aft-looking camera may be eliminated, then, by starting at the left end of the film with image moving relative to the film at a speed faster than normal, decreasing that relative image speed as the image moves toward the center of the film at which point the image speed ideally should be at the normal scan speed, and continuing to decrease that relative image speed from the center point until that relative image speed reaches minimum speed below normal at the right end of the film.

Figure 8:
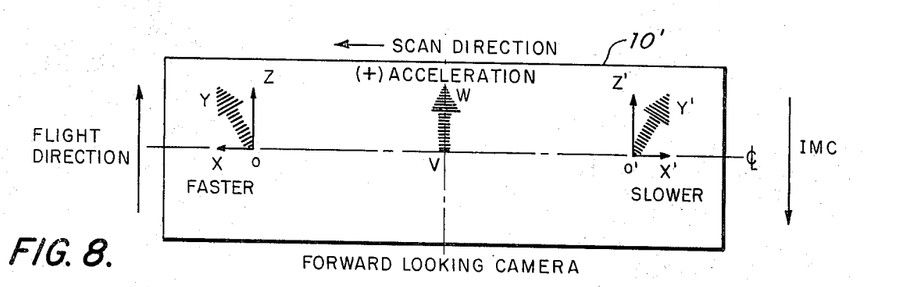
FIG. 8 is a sketch of the vector velocities of the image in a forward-looking camera with right-to-left scan induced image motion.

The discussion of the vectors in FIG. 6 applies equally as well to the vectors in FIG. 8. The difference in scan direction changes the direction of relative motion between film and image, but an acceleration is still required.

Figure 9:
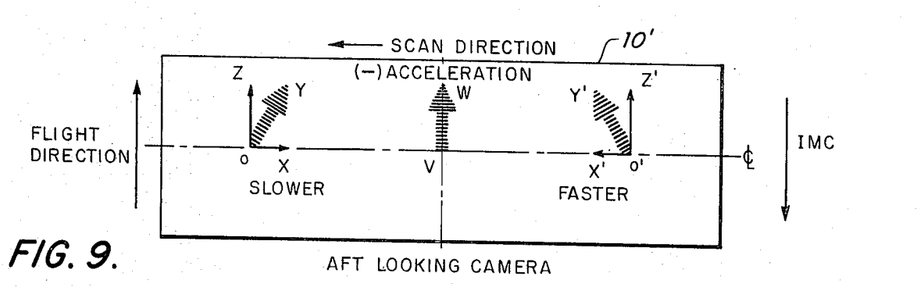
FIG. 9 is a sketch of the vector velocities of the image in an aft-looking camera with right-to-left scan induced image motion.

Similarly, the discussion of the vectors in FIG. 7 applies to the vectors in FIG. 9. The difference in scan direction changes the direction of relative motion between film and image.

Figure 10:
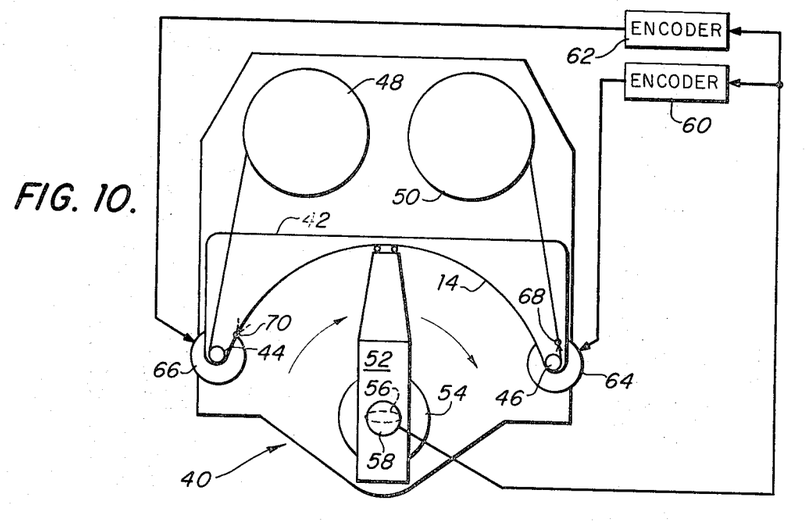
FIG. 10 shows an embodiment of the invention applied to a direct scanning type panoramic camera.

An embodiment of the invention capable of correction for cross-axis distortion is shown in FIG. 10 in association with a direct scanning type panoramic camera 40 in which the film 14 is normally held stationary on platen 42 during an entire scan. After each scan is complete takeup roller 44 may be actuated to move a length of exposed film 14 over roller 46 to roll 48, thereby supplying fresh film of the same length from supply roll 50. Commonly used dancer rolls are omitted here and in the following FIGS. 11—16 as well. The relative motion between film and image is provided in this embodiment by rotating scanning mechanism 52 in the clockwise direction by means of motor 54. Scanning is actually performed by means of lens 56 as it is rotated with mechanism 52.

The angular position of scanning mechanism 52 is sensed by element 58 which may be a magnetic sensing head for sensing coded indicia on a rotatable portion of mechanism 52 as it rotates. Signals representative of the angular position of mechanism 52 are delivered to encoders 60 and 62 which supply signals directing positive or negative accelerations of film 14 to motors 64 and 66, respectively; motor 66 may be the same means used to drive takeup roller 44 after each scan. Encoders 60 and 62 function to correlate the acceleration of film strip 14 with the position of scanning mechanism 52. For example, if camera 40 is a forward-looking camera, film 14 is disposed in platen 42 so that film to be exposed extends from a point 68 behind roller 46 to a point 70 short of roller 44 and motor 66 is driven to draw film 14 in the takeup direction at an initially high velocity when mechanism 52 is at its starting scanning position near roller 44, and to decrease that velocity as the scan reaches the center position. At the center position the velocity of the film is zero and the length of film being exposed is centered on platen 42. As the scan passes the center position motor 64 is driven by encoder 60 to draw film 14 in the opposite direction with velocity increasing as a function of the scan angle until the scan reaches the area proximate roller 46. At that time motor 64 is no longer driven to draw film 14 and the film is again positioned with the exposed length of film displaced as at the beginning of the scan. Thus, by moving film 14 with negative acceleration from starting to center of the scan, then with positive acceleration from the center to the end of scan, a positive acceleration has been provided between the film and the image from start to end of scan, which results in slower than normal motion between film and image at the start, normal motion at the center and faster than normal motion at the end of scan.

Figure 11:
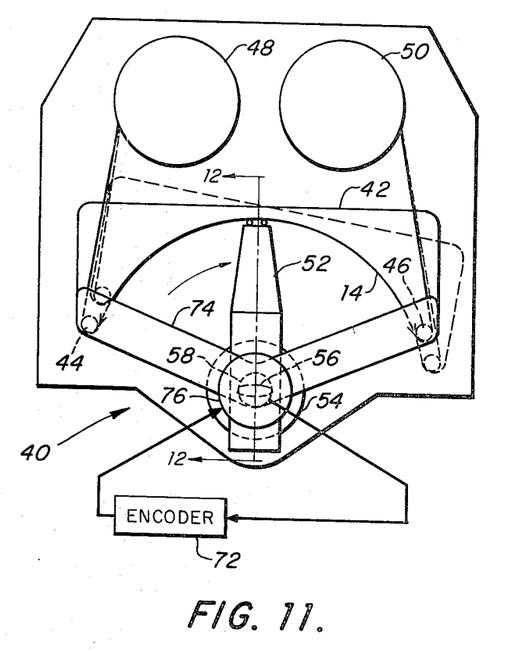
FIG. 11 shows another embodiment of the invention applied to a direct scanning type panoramic camera.
Figure 12:
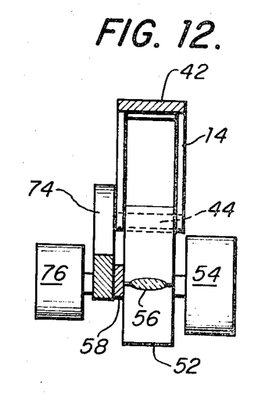
FIG. 12 is a sectional view along line 12-12 of FIG. 11.

A second embodiment similar to that of FIG. 10 is shown in FIGS. 11 and 12 where like elements have been given like numbers. As in FIG. 10, motor 54 drives scanning mechanism 52 in the clockwise direction and the scanning is accomplished by lens 56 as it rotates with mechanism 52. The angular position of the scan is sensed by element 58 and a signal representative thereof is supplied to encoder 72. Encoders 60 and 62 function to correlate the acceleration of film strip 14 with the position of scanning mechanism 52. Uniform relative motion between film and image is supplied initially by the movement of lens 56 with mechanism 52, and new film is supplied after each scan by driving takeup roller 44 by means not shown to draw in the exposed length of film.

Accelerated motion between film and image to correct for cross-axis components is provided by moving platen 42 in the counterclockwise direction from the position shown in phantom to the full line position from the start to the center of the scan, then in the clockwise direction from the center of the scan to the end of the scan. Platen 42 is moved with decreasing velocity, negative acceleration, from a maximum velocity at the start to zero at the center and then with increasing velocity, positive acceleration, from the center to the end where it reaches maximum velocity. These maximums are in opposite directions.

The motion is provided by means of support member 74 attached to each end of platen 42 and rotatable about the rotational axis of mechanism 52 by means of motor 76 which is responsive to encoder 72. Dancer rollers, not shown, accommodate any tension variations in film 14 caused by motion of platen 42 relative to rolls 48 and 50.

Figure 13:
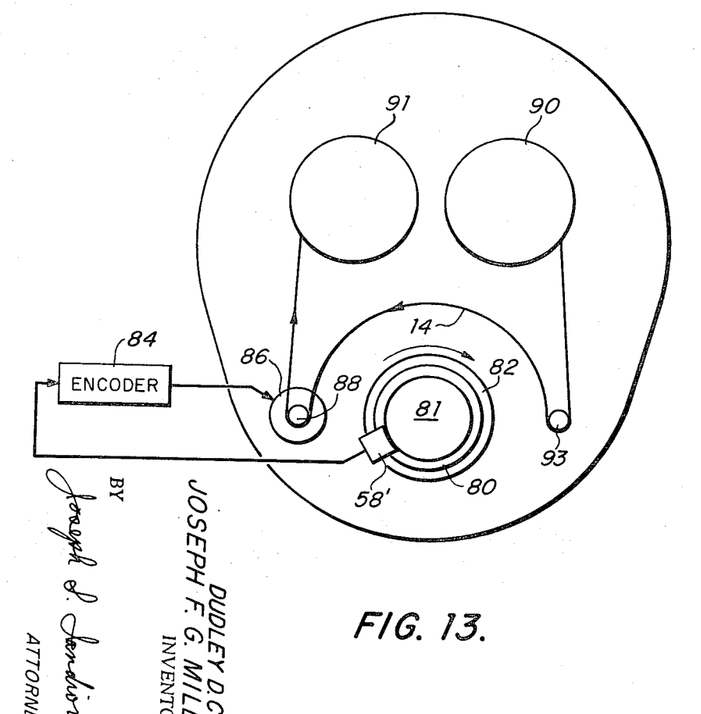
FIG. 13 shows an embodiment of the invention applied to an optical bar type panoramic camera.

In panoramic cameras in which both the scanning mechanism and the film are in motion, such as rotating optical bar types, FIG. 13, the rotation of the optical bar 80 by motor 82 is sensed from coded indicia on member 81 by sensing element 58 which delivers a signal representative of the scan position to encoder 84. Encoders 60 and 62 function to correlate the acceleration of film strip 14 with the position of scanning mechanism 52. And the speed of motor 86 which drives the takeup roller 88 to provide a continuous flow of new film from supply roll 90 to roll 91 over roller 93 may be decreased and increased in each scan cycle to provide the proper accelerated motion between the film and image. In the forward-looking camera in FIG. 13 with clockwise rotation of optical bar 80 and counterclockwise rotation of film 14, motor 86 is driven to take up film 14 at lower than normal speed at the beginning of each scan and to increase the speed of, positively accelerate, the film so that the film is up to normal speed at center scan and is at higher than normal speed when end of scan is reached.

Figure 14:
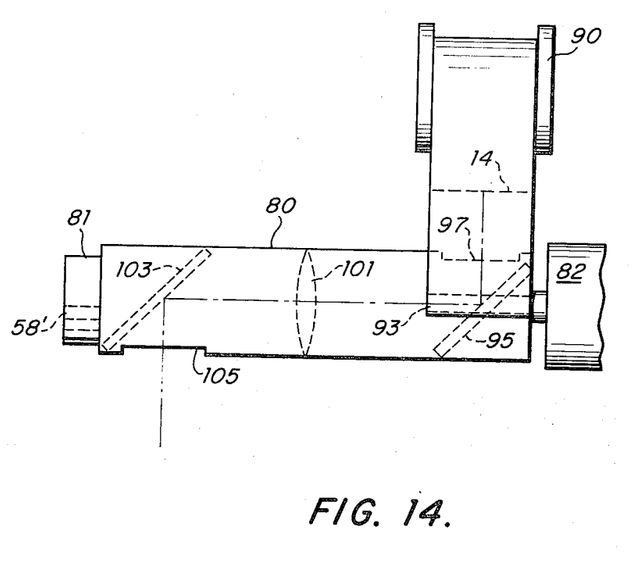
FIG. 14 is a side view of FIG. 13.

In the optical bar type camera, FIG. 13, the entire scanning mechanism or optical bar 80 rotates to provide the scanning motion and the means for scanning is the lens 101 accompanied by suitable reflectors 95 and 103, operative through apertures 97 and 105, respectively, FIG. 14. In the direct scanning type cameras, too, FIGS. 10, 11, and 12, the scanning mechanism rotates to provide the scanning motion and the means for scanning is the lens. But the invention is not limited to such structures; it is as well applicable to other types of cameras. For example, in cameras in which the scanning mechanism includes a lens which does not rotate and a rotating prism or scanning mirror which does, the rotation of the prism provides the scan motion and the moving film may be speeded up and slowed down by a system similar to those disclosed.

Figure 15:
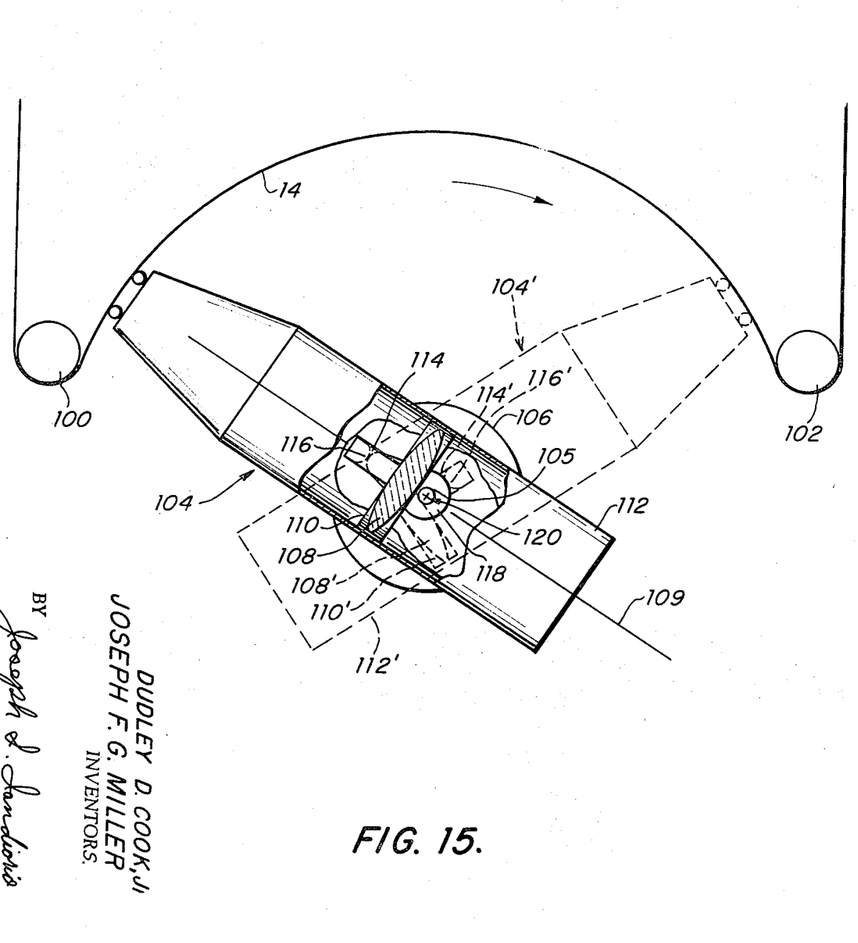
FIG. 15 shows an embodiment of the invention applied to a direct scanning type panoramic camera.
Figure 16:
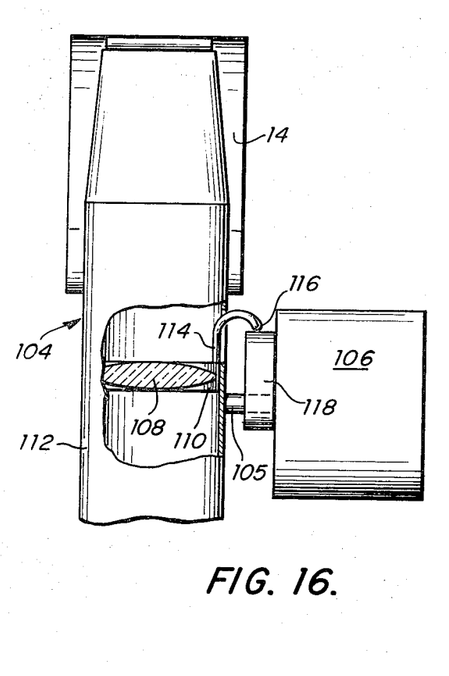
FIG. 16 is a fragmentary side view of the scanning mechanism shown in FIG. 15.

Another embodiment of the invention is shown in FIGS. 15 and 16, where the invention is applied to a direct scanning type of camera. This embodiment is applicable to other types as well, for example the previously mentioned rotating prism type. In FIG. 15 the camera is forward-looking, the film 14 is stationary during scan, and the length of film to be exposed is centered between rollers 100 and 102. Scanning mechanism 104 rotated with shaft 105 by motor 106 provides the relative motion between film and image. The scanning means of the scanning mechanism is lens 108 and it is the motion of lens 108 relative to film 14 along the optic axis 109 of the lens which modifies the relative motion between the image and film. Lens 108 is mounted in a support member 110 slidable in barrel 112 of mechanism 104. A follower 114 extends from member 110 through barrel 112, in an upward direction along the barrel 112 and then hooks over in a downward-turning tab 116 which rides on cam 118 fixed against rotation. As mechanism 104 rotates with shaft 105 in the clockwise direction, tab 116 follows the surface of cam 118, which surface maintains tab 116, thus lens 108 at maximum distance from the center of rotation 120 at the beginning of the scan, full lines FIG. 15, and at minimum distance from center 120 at the end of the scan, phantom lines FIG. 15. Cam 118 is fixed to motor 106 and is not rotatable with shaft 105. Lens 108 therefore is rotated about a point below its nodal point at the beginning of the scan, about its nodal point at the center of the scan, and about a point above its nodal point at the end of the scan. To illustrate, the scanning mechanism including lens 108, member 110, follower 114, tab 116, in barrel 112 is shown in dashed lines in a position rotated clockwise about center of rotation 120 and stationary cam 118. In the dashed line representation like parts are referred to by like numbers primed. In the dashed line representation tab 116' rest on a low portion of cam 118 and lens 108' is below the center of rotation 120. The distance between the nodal point of the lens and the center of rotation 120 decreases from a maximum at the beginning of scan to zero at center scan and then increases to a maximum at end of scan. These maximums are in opposite directions. The effect of moving lens 108 toward and away from center of rotation 120 in barrel 112 is to shorten and lengthen the distance the image must travel from the lens to the film. At the beginning of scan when that distance is shortest the translational velocity of the image is slower than normal and at end of scan the translational velocity of the image is faster than normal; at center scan the velocity of the image is normal. The result is a positive acceleration of the image relative to the film which offsets the cross-axis component of the IMC.

The same type of lens motion may be used to compensate for cross-axis error in rotating prism type cameras. And it should be understood that many different embodiments of the invention may be used in many different types of cameras to correct this error by providing accelerated relative motion between film and image and are within the scope of this invention.

In the preceding explanations the point at which the compensation for cross-axis image motion is unnecessary, i.e., where the cross-axis motion component is zero, has been referred to as the center scan or center scan position. However it should be understood that this is only true when the center scan coincides with the ground track as it does in all of the examples herein. Were the camera shifted to look to one side so that the scan began at the ground track, or did not include the ground track, in the former case cross-axis component would be zero at the start of the scan and in the latter case there would be no point in the scan where the cross-axis component is zero.

Other embodiments will occur to those skilled in the art and are within the following claims:

We claim:

1. In a panoramic camera, having a scanning means and a film medium which is scanned, which, in its operative position, is subject to a forward motion relative to the imagery being photographed and which scans the imagery in a direction transverse to the forward motion and which has its axis about which it scans the imagery tilted relative to the imagery, thereby causing motion components of the imagery relative to the camera along said transverse direction, the improvement comprising means to lessen distortion of the photographed imagery due to said motion components including means to modify the rate at which the film medium is scanned to compensate for said motion components.

2. Apparatus as set forth in claim 1 wherein said means to lessen distortion includes means to accelerate said rate of scan when said motion components are in the direction of the scan.

3. Apparatus as set forth in claim 1 wherein said means to lessen distortion includes means to decelerate the rate of scan when said motion components are in a direction opposite to the direction of the scan.

4. Apparatus as set forth in claim 3 wherein said means to lessen distortion additionally includes means to accelerate said rate of scan when said motion components are in the direction of the scan.

5. Apparatus as set forth in Claim 1 wherein said means to lessen distortion includes:
   a. means to sense the angular position of the scanning means and render an output indicative thereof;
   b. positioning means to shift the position of the film medium relative to the scanning means; and
   c. correlating means, having an input from said sensing means, for instructing said positioning means, depending upon the output of said sensing means, to cause said positioning means to shift the position of the film medium relative to the scanning means to compensate for said motion components.

6. Apparatus as set forth in claim 5 wherein said correlating means causes said positioning means to shift the film medium opposite to the direction of the scan to provide an accelerated rate of scan when said motion components are in the direction of the scan, and to shift the film medium in the direction of the scan to provide a decelerated rate of scan when said motion components are in a direction opposite to the direction of the scan.

7. Apparatus as set forth in claim 6 wherein said camera includes a film support platen having an arcuate shape centered about said scanning means, and said positioning means includes means to angularly rotate the platen about said scanning means to shift the film medium relative to the scanning means.

8. Apparatus as set forth in claim 5 wherein said camera includes a film support platen having an arcuate shape centered about said scanning means, and said positioning means includes means to angularly rotate the platen about said scanning means to shift the film medium relative to the scanning means.

9. Apparatus as set forth in claim 1 wherein said panoramic camera is a camera which has the scanning means in motion relative to the film while a motor means drives the film in motion relative to the scanning means and including:
   a. means to sense the angular position of said scanning means and render an output indicative thereof; and
   b. correlating means, having an input from said sensing means, to instruct said motor means to cause the speed at which the film is driven past the scanning means to be modified to modify the rate which the scanning means scans the film medium, thereby compensating for said motion components.

10. Apparatus as set forth in claim 9 wherein said motor means increases the film speed to provide a higher rate of scan when said motion components are in the direction of the scan and decreases the film speed to provide a lower rate of scan when said motion components are in a direction opposite to the direction of the scan.

11. Apparatus as set forth in claim 1 wherein said means to lessen distortion includes:
   a. means to sense the angular position of the scanning means and render an output indicative thereof; and
   b. means, having an input from said sensing means, to modify the rate at which the scanning means scans the film medium.

12. Apparatus as set forth in claim 11 wherein said scanning means comprises a lens system and including:
   a. means to support the lens system for translational movement toward and away from the film medium; and
   b. said means to modify the rate of scan includes means to move the lens system toward and away from the film medium to change the translational velocity of the scanned image relative to the film medium.

13. Apparatus as set forth in claim 12 wherein said means to modify moves the lens system away from the film medium to provide a higher rate of scan when said motion components are in the direction of the scan, and moves the lens system toward the film medium to provide a lower rate of scan when said motion components are in a direction opposite the direction of the scan.